United States Patent
Watanabe et al.

(10) Patent No.: US 11,433,540 B2
(45) Date of Patent: Sep. 6, 2022

(54) ROBOT CONTROL APPARATUS, AND METHOD AND PROGRAM FOR OBTAINING ANGLE OF JOINT OF ROBOT

(71) Applicant: Nidec Corporation, Kyoto (JP)

(72) Inventors: Hirokazu Watanabe, Kyoto (JP); Haruhiro Tsuneta, Kyoto (JP)

(73) Assignee: NIDEC CORPORATION, Kyoto (JM)

( * ) Notice: Subject to any disclaimer, the term of this patent is extended or adjusted under 35 U.S.C. 154(b) by 466 days.

(21) Appl. No.: 16/360,249

(22) Filed: Mar. 21, 2019

(65) Prior Publication Data
US 2019/0299416 A1 Oct. 3, 2019

(30) Foreign Application Priority Data
Mar. 30, 2018 (JP) .............................. JP2018-067235

(51) Int. Cl.
*B25J 9/16* (2006.01)
*B25J 9/06* (2006.01)

(52) U.S. Cl.
CPC .............. *B25J 9/1692* (2013.01); *B25J 9/06* (2013.01); *B25J 9/1666* (2013.01)

(58) Field of Classification Search
CPC . B25J 9/1692; B25J 9/1666; B25J 9/06; B25J 9/1607; B25J 9/046; B25J 9/1664; B25J 17/02; B25J 9/047; G05B 2219/39077; G05B 19/19; G05B 2219/35349
USPC .............................. 700/61, 62, 245, 261, 262
See application file for complete search history.

(56) References Cited

U.S. PATENT DOCUMENTS

| | | | |
|---|---|---|---|
| 4,680,519 A | 7/1987 | Chand et al. | |
| 2012/0109380 A1* | 5/2012 | Yoshida | G05B 19/4155 700/262 |
| 2012/0239194 A1* | 9/2012 | Kagawa | B25J 9/1692 700/254 |
| 2013/0041509 A1* | 2/2013 | Saito | B25J 9/047 700/261 |
| 2013/0218331 A1* | 8/2013 | Nammoto | B25J 9/1643 700/245 |

(Continued)

*Primary Examiner* — B M M Hannan
(74) *Attorney, Agent, or Firm* — Keating & Bennett

(57) ABSTRACT

In a method of obtaining an angle of each joint of a 6-axis vertical articulated robot when a position and a posture of an end effector attached on a sixth axis are given, a predetermined amount of offset exists between a sixth axis and a fourth axis, and the method includes sequentially determining a point of interest, which is a point on a circumference of a circle having the predetermined amount as a radius, around a first intersection point, on a plane which includes the first intersection point which is an intersection point of the sixth axis and the fifth axis and the plane which is orthogonal to the sixth axis, calculating a second intersection point, which is an intersection point of the fourth axis and the third axis, when it is assumed that the point of interest is an intersection point of the fifth axis and the fourth axis, calculating an inner product value of a first vector directed from the calculated second intersection point to the point of interest and a second vector directed from the point of interest to the first intersection point, and estimating that the point of interest, when an absolute value of the inner product value is less than or equal to a predetermined threshold, is an intersection point of the fifth axis and the fourth axis.

4 Claims, 15 Drawing Sheets

(56) References Cited

U.S. PATENT DOCUMENTS

| | | | |
|---|---|---|---|
| 2015/0039129 A1* | 2/2015 | Yasuda | B25J 9/1633 |
| | | | 700/258 |
| 2015/0290810 A1* | 10/2015 | Iwatake | B25J 9/1651 |
| | | | 700/258 |
| 2016/0221185 A1 | 8/2016 | Sueyoshi et al. | |
| 2017/0291297 A1* | 10/2017 | Miyasaka | B25J 9/047 |
| 2018/0001486 A1* | 1/2018 | Toshimitsu | B25J 9/0018 |
| 2018/0065254 A1* | 3/2018 | Okahisa | B25J 9/047 |
| 2018/0236669 A1* | 8/2018 | Fukuda | B25J 13/089 |
| 2019/0275673 A1* | 9/2019 | Kawase | B25J 9/1607 |
| 2019/0286095 A1* | 9/2019 | Crivella | B29C 73/26 |

* cited by examiner

ARM PLANE

ROBOT CONTROL APPARATUS, AND METHOD AND PROGRAM FOR OBTAINING ANGLE OF JOINT OF ROBOT

CROSS REFERENCE TO RELATED APPLICATIONS

This application claims the benefit of priority to Japanese Patent Application No. 2018-067235 filed on Mar. 30, 2018. The entire contents of this application are hereby incorporated herein by reference.

BACKGROUND OF THE INVENTION

1. Field of the Invention

The present disclosure relates to a robot control apparatus, and a method and program for obtaining an angle of a joint of a robot.

2. Description of the Related Art

A Programmable Universal Machine for Assembly (PUMA)-type robot is generally known as a robot having an axis configuration in which rotation axes of three joints of hand tips intersect at one point.

The analysis of inverse kinematics of a PUMA-type robot is thought to be analytically determined. However, when there is an offset in a wrist portion of the robot, a processing load of calculation of the inverse kinematics is heavy and it takes time. For this reason, a high-speed processor is required to perform real-time calculation suitable for the robot to operate smoothly.

SUMMARY OF THE INVENTION

An example embodiment of the present disclosure is a robot control apparatus for obtaining an angle of each joint of a 6-axis vertical articulated robot when a position and a posture of an end effector attached on a sixth axis are given, wherein, in the 6-axis vertical articulated robot, the sixth axis of a sixth joint and a fifth axis of a fifth joint perpendicularly intersect each other, the fifth axis and a fourth axis of a fourth joint perpendicularly intersect each other, the fourth axis and a third axis of a third joint perpendicularly intersect each other, and there is a predetermined amount of offset between the sixth axis and the fourth axis. The robot control apparatus includes a determiner to sequentially determine a point of interest, which is a point on a circumference of a circle having the predetermined amount as a radius, around a first intersection point on a plane including the first intersection point which is an intersection point of the sixth axis, and the fifth axis and the plane which is orthogonal to the sixth axis. The robot control apparatus includes a first calculator to calculate a second intersection point, which is an intersection point of the fourth axis and the third axis, when it is assumed that the point of interest is an intersection point of the fifth axis and the fourth axis, and a second calculator to calculate an inner product value of a first vector directed from the second intersection point calculated by the first calculator to the point of interest and a second vector directed from the point of interest to the first intersection point. The robot control apparatus includes an estimator to estimate that the point of interest, when an absolute value of the inner product value is less than or equal to a predetermined threshold, is an intersection point of the fifth axis and the fourth axis.

The above and other elements, features, steps, characteristics and advantages of the present disclosure will become more apparent from the following detailed description of the example embodiments with reference to the attached drawings.

DETAILED DESCRIPTION OF THE PREFERRED EMBODIMENTS

Hereinafter, robot systems including robot control apparatuses according to example embodiments of the present disclosure will be described.

In the following description, unless otherwise indicated, points refer to points in a world coordinate system (robot coordinate system).

Figure 1:
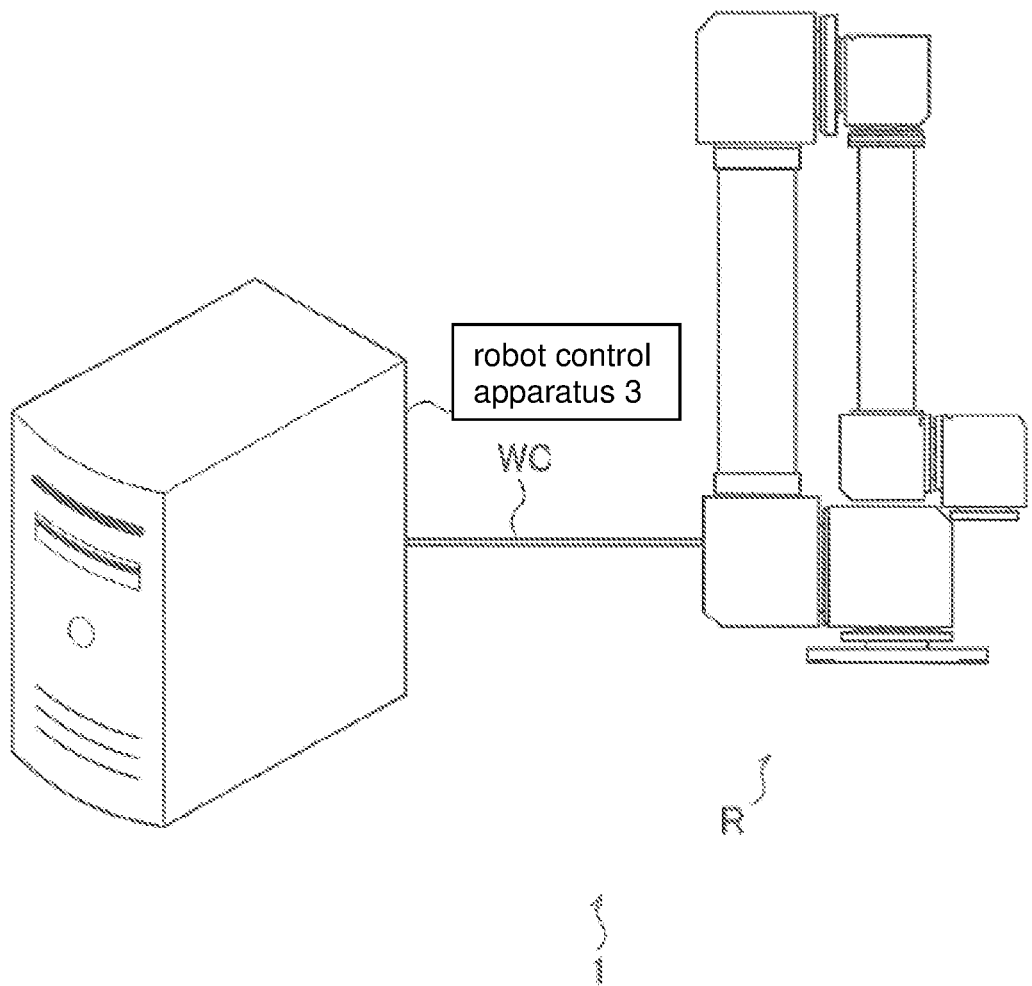
FIG. 1 is a schematic view showing a configuration of a robot system of a robot according to an example embodiment of the present disclosure.
Figure 2:
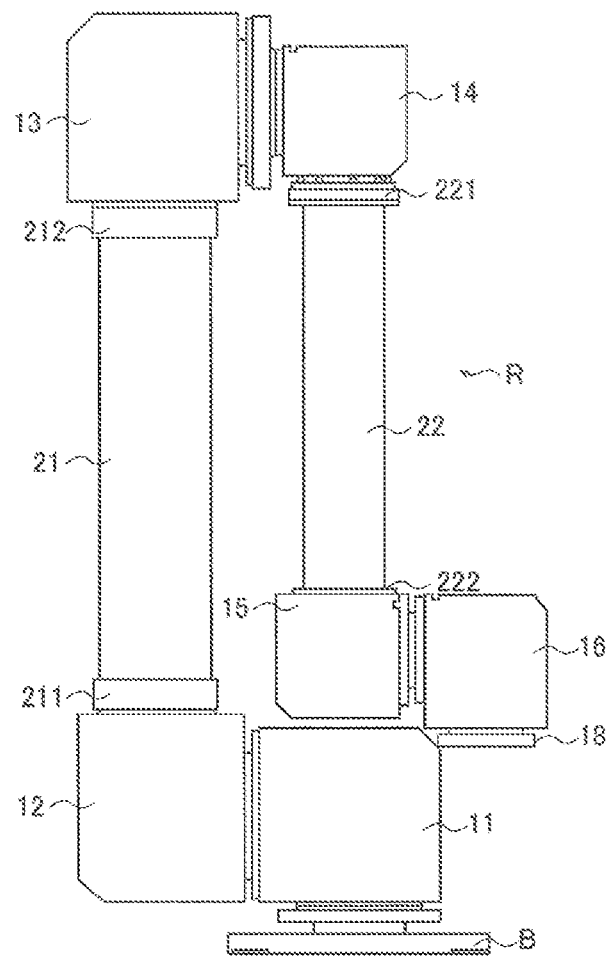
FIG. 2 is a front view of a robot according to an example embodiment of the present disclosure in a state in which a second arm is lowered.
Figure 3:
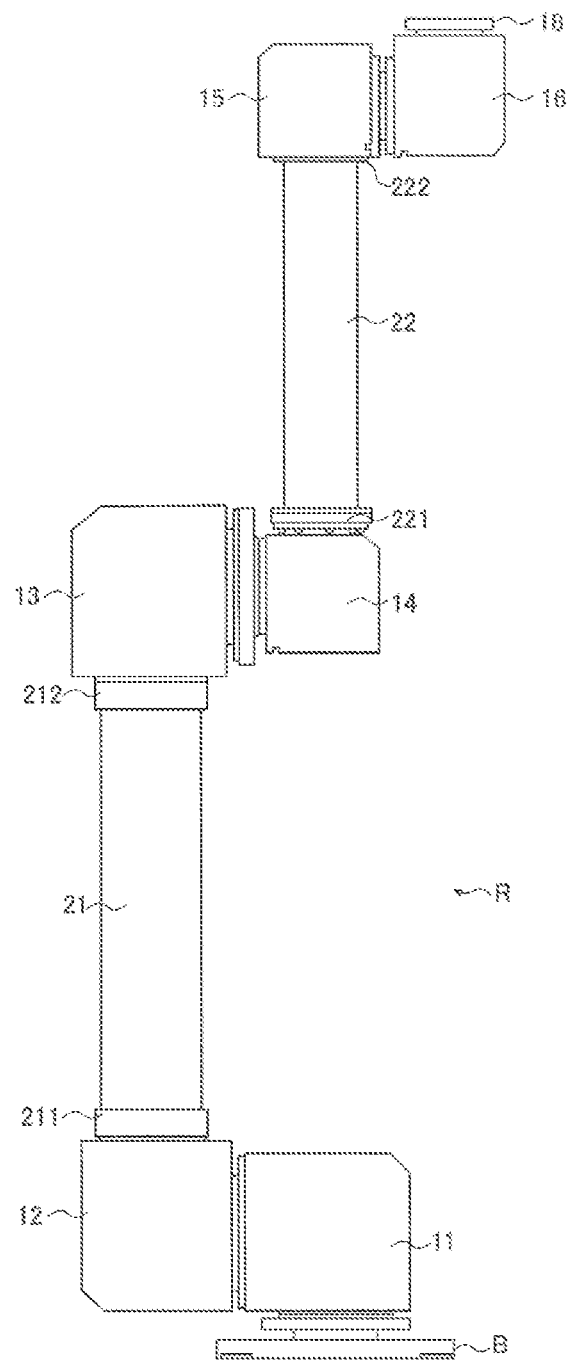
FIG. 3 is a front view of a robot according to an example embodiment of the present disclosure in a state in which the second arm is raised.

First, a configuration of a robot system 1 according to a first embodiment will be described with reference to FIGS. 1 to 3. FIG. 1 is a schematic view showing a configuration of the robot system 1 according to the present embodiment. FIG. 2 is a front view of a robot according to the present embodiment in a state in which a second arm (to be described below) is lowered. FIG. 3 is a front view of the robot according to the present embodiment in a state in which the second arm is raised.

A robot R according to the present embodiment is an articulated robot which is used for assembling or manufacturing predetermined products and is installed and used, for example, on an assembly line or a production line.

As shown in FIGS. 2 and 3, the robot R includes a plurality of joints and a plurality of arms. In an example of the present embodiment, the robot R includes six joints 11 to 16, a first arm 21, a second arm 22, and an end effector attaching portion 18. Although not shown in the drawings, each of the joints includes a motor, a decelerator connected to the motor, a position detecting mechanism for detecting a rotational position of the motor, and a circuit board on which the motor and the position detecting mechanism are electrically connected.

Further, the robot R includes a support member B constituting a base end portion of the robot R. The support member B is relatively rotatably connected to a first joint 11. The first arm 21 and the second arm 22 are formed to have a thinly elongated longitudinal shape. Specifically, each of the first arm 21 and the second arm 22 is formed to have a thinly elongated cylindrical shape.

In the robot R, the following fixed or connected relationships are established.

(i) The first joint 11 and a second joint 12 are relatively rotatably connected to each other.

(ii) The second joint 12 and a first end 211 of the first arm 21 are fixed to each other.

(iii) A second end 212 of the first arm 21 and a third joint 13 are fixed to each other.

(iv) The third joint 13 and a fourth joint 14 are relatively rotatably connected to each other.

(v) The fourth joint 14 and a first end 221 of the second arm 22 are relatively rotatably connected to each other.

(vi) A second end 222 of the second arm 22 and a fifth joint 15 are fixed to each other.

(vii) The fifth joint 15 and a sixth joint 16 are relatively rotatably connected to each other.

(viii) The sixth joint 16 and the end effector attaching portion 18 are relatively rotatably connected to each other.

An end effector such as a hand or a tool may be attached to the end effector attaching portion 18.

Figure 4:
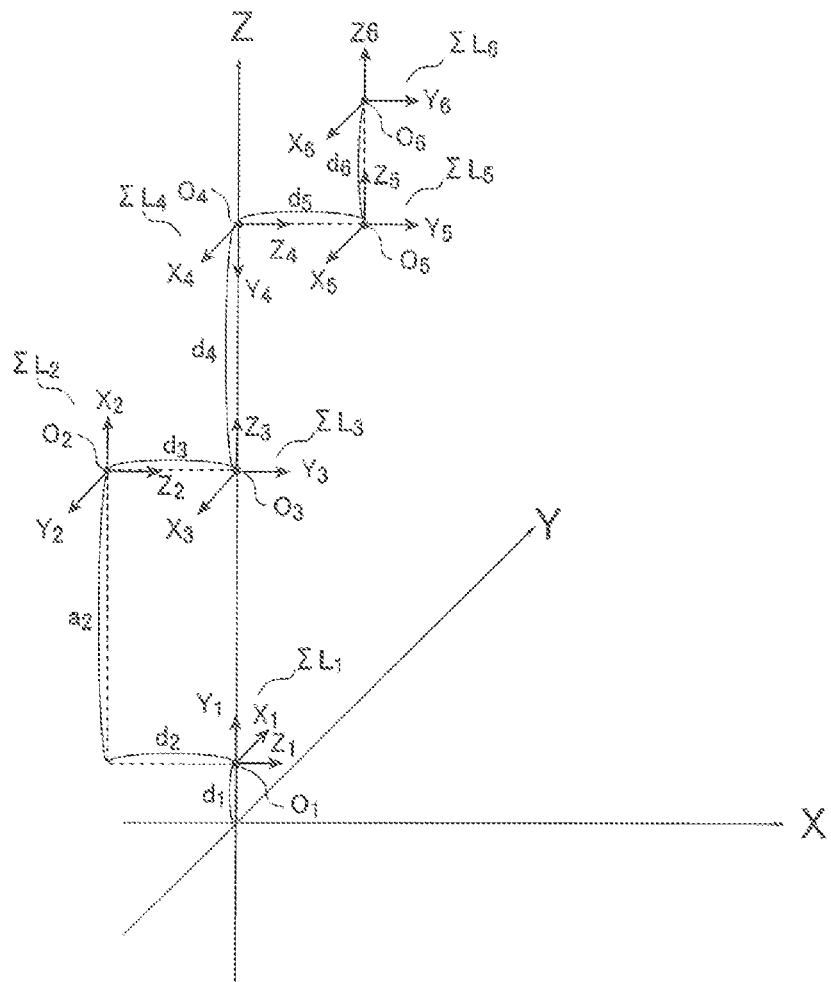
FIG. 4 is a view showing a link coordinate system of a robot according to an example embodiment of the present disclosure.

Hereinafter, in order to describe a mechanism of the robot R according to the present embodiment, Denavit-Hartenberg (DH) parameters are shown as link parameters of the robot R according to the present embodiment, and forward kinematics of the robot R according to the present embodiment will be described with reference to FIG. 4 as a reference. FIG. 4 is a view showing a link coordinate system of the robot R according to the embodiment.

In the robot R shown in FIGS. 2 and 3, when it is assumed that intersection points of rotation axes (an intersection point of Z-axes) set by the respective joints are intersection points $O_1$ to $O_5$ and an installation position of an end effector is a point $O_6$, Link1 to Link6 coordinate systems, which are link coordinate systems having points $O_1$ to $O_6$ as original points, are shown in FIG. 4. In FIG. 4, the Link1 to Link6 coordinate systems are denoted by $\Sigma L_1$ to $\Sigma L_6$, respectively. Further, the link shown in FIG. 4 corresponds to a posture of the robot R in FIG. 3.

As shown in FIG. 4, in the robot R according to the present embodiment, there is an offset of an interlink distance $d_5$ between the intersection point $O_4$ and the intersection point $O_5$.

The DH parameters of the robot R are as shown in Table 1 below. In FIG. 4, since an equation, $d_2=d_3$, is established with respect to interlink distances $d_2$ and $d_3$, the interlink distances $d_2$ and $d_3$ may be zero on the DH parameters.

TABLE 1

| Coordinate System | Interlink Distance d [mm] | Interlink Angle θ [deg] | Link Length a [mm] | Link Twist Angle α [deg] |
|---|---|---|---|---|
| Link1 Coordinate System ($\Sigma L_1$) | $d_1$ | $90 + \theta_1$ | 0 | 90 |
| Link2 Coordinate System ($\Sigma L_2$) | 0 | $90 + \theta_2$ | $a_2$ | 0 |
| Link3 Coordinate System ($\Sigma L_3$) | 0 | $90 + \theta_3$ | 0 | 90 |
| Link4 Coordinate System ($\Sigma L_4$) | $d_4$ | $\theta_4$ | 0 | −90 |
| Link5 Coordinate System ($\Sigma L_5$) | $d_5$ | $\theta_5$ | 0 | 90 |
| Link6 Coordinate System ($\Sigma L_6$) | $d_6$ | $\theta_6$ | 0 | 0 |

A homogeneous transformation matrix $T_1$ for the Link1 coordinate system $\Sigma L_1$ from a world coordinate diameter is obtained using the DH parameters as follows.

$$T_1 = \begin{bmatrix} \cos(\theta_1 + 90) & -\sin(\theta_1 + 90) & 0 & 0 \\ \sin(\theta_1 + 90) & \cos(\theta_1 + 90) & 0 & 0 \\ 0 & 0 & 0 & d_1 \\ 0 & 0 & 0 & 1 \end{bmatrix}.$$

$$\begin{bmatrix} 1 & 0 & 0 & 0 \\ 0 & \cos(\alpha_1) & -\sin(\alpha_1) & 0 \\ 0 & \sin(\alpha_1) & \cos(\alpha_1) & 0 \\ 0 & 0 & 0 & 1 \end{bmatrix}$$

$$= \begin{bmatrix} -\sin(\theta_1) & 0 & \cos(\theta_1) & 0 \\ \cos(\theta_1) & 0 & \sin(\theta_1) & 0 \\ 0 & 1 & 0 & d_1 \\ 0 & 0 & 0 & 1 \end{bmatrix}$$

Hereinafter, when it is assumed that equations, $S_n = \sin(\theta_n)$ and $C_n = \cos(\theta_n)$, are established, homogeneous transformation matrixes $T_1, T_2, T_3, T_4, T_5$, and $T_6$ among the respective link coordinate systems are as follows.

$$T_1 = \begin{bmatrix} -S_1 & 0 & C_1 & 0 \\ C_1 & 0 & S_1 & 0 \\ 0 & 1 & 0 & d_1 \\ 0 & 0 & 0 & 1 \end{bmatrix}$$

$$T_2 = \begin{bmatrix} -S_2 & -C_2 & 0 & -a_2 S_2 \\ C_2 & -S_2 & 0 & a_2 C_2 \\ 0 & 0 & 1 & 0 \\ 0 & 0 & 0 & 1 \end{bmatrix}$$

$$T_3 = \begin{bmatrix} -S_3 & 0 & C_3 & 0 \\ C_3 & 0 & S_3 & 0 \\ 0 & 1 & 0 & 0 \\ 0 & 0 & 0 & 1 \end{bmatrix}$$

-continued $$T_4 = \begin{bmatrix} C_4 & 0 & -S_4 & 0 \\ S_4 & 0 & C_4 & 0 \\ 0 & -1 & 0 & d_4 \\ 0 & 0 & 0 & 1 \end{bmatrix}$$

$$T_5 = \begin{bmatrix} C_5 & 0 & -S_5 & 0 \\ S_5 & 0 & -C_5 & 0 \\ 0 & 1 & 0 & d_5 \\ 0 & 0 & 0 & 1 \end{bmatrix}$$

$$T_6 = \begin{bmatrix} C_6 & -S_6 & 0 & 0 \\ S_6 & C_6 & 0 & 0 \\ 0 & 0 & 1 & d_6 \\ 0 & 0 & 0 & 1 \end{bmatrix}$$

From the above, a homogeneous transformation matrix $T_{ee}$ of the end effector is calculated from the homogeneous transformation matrixes among the respective link coordinate systems using the following Equation 1. By applying Equation 1, a position and a posture of the end effector may be obtained when the rotation angle of each joint is known.

$$Tee = T_1 T_2 T_3 T_4 T_5 T_6 \tag{1}$$

Next, a calculation algorithm (hereinafter, simply referred to as "an algorithm according to the present embodiment") of analysis of inverse kinematics of the robot R according to the present embodiment will be described with reference to FIGS. 5 to 12.

Since the algorithm according to the present embodiment is based on a calculation algorithm of analysis of inverse kinematics of a reference robot, the reference robot will be described below in addition to the description of the robot R according to the present embodiment. Unlike the robot R according to the present embodiment, the reference robot refers to a robot (commonly known as a Programmable Universal Machine for Assembly (PUMA)-type robot) having no offset in a wrist, that is, a robot in which the interlink distance $d_3$ in FIG. 4 is zero.

Figure 5:
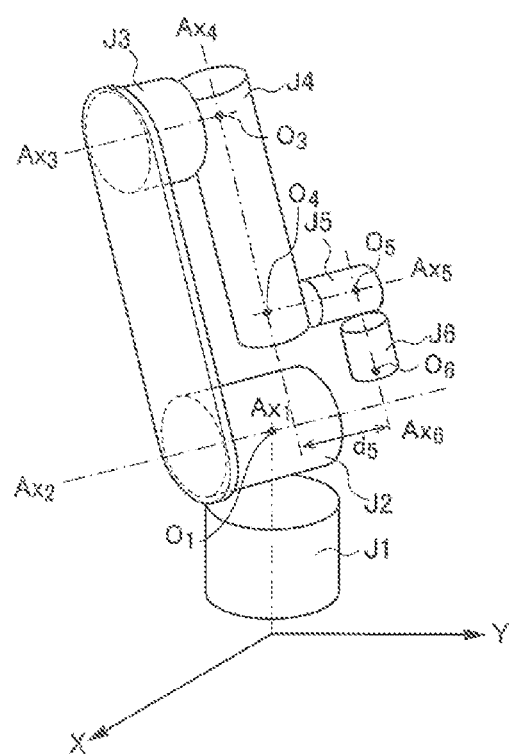
FIG. 5 is a perspective view of a modeled robot according to an example embodiment of the present disclosure in a case in which the robot has a certain posture.
Figure 6:
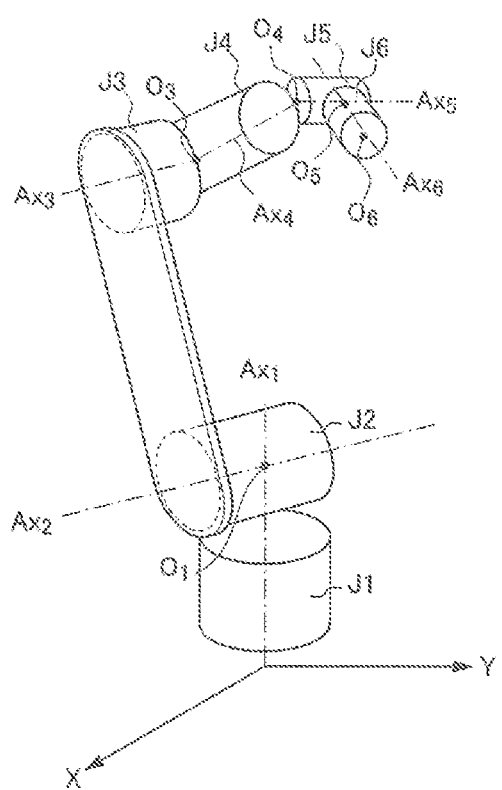
FIG. 6 is a perspective view of a modeled robot according to an example embodiment of the present disclosure in a case in which the robot has another posture.

First, the robot R according to the present embodiment is modeled as shown in FIGS. 5 and 6.

FIGS. 5 and 6 are perspective views of a robot model which is modeled based on the joints and the links of the robot R according to the present embodiment and represent different postures of the robot R. The posture of the robot model according to the present embodiment in FIG. 5 is a posture similar to that of the robot R shown in FIG. 2.

In FIGS. 5 and 6, the robot model according to the present embodiment includes six joints J1 to J6, and axes (rotation axes) of the six joints J1 to J6 are axes $Ax_1$ to $Ax_6$, respectively. In the actual robot R shown in FIGS. 2 and 3, the joints J1 to J6 rotating around the axes $Ax_1$ to $Ax_6$ correspond to the joints 11 to 16, respectively.

An intersection point of the axis $Ax_3$ and the axis $Ax_4$ is an intersection point $O_3$, an intersection point of the axis $Ax_4$ and the axis $Ax_5$ is an intersection point $O_4$, and an intersection point of the axis $Ax_5$ and the axis $Ax_6$ is an intersection point $O_5$. A point $O_6$ is an installation position of an end effector on the axis $Ax_6$.

As shown in FIG. 5, in the robot model according to the present embodiment, an offset $d_5$ is provided between the axis $Ax_4$ and the axis $Ax_6$.

Figure 7:
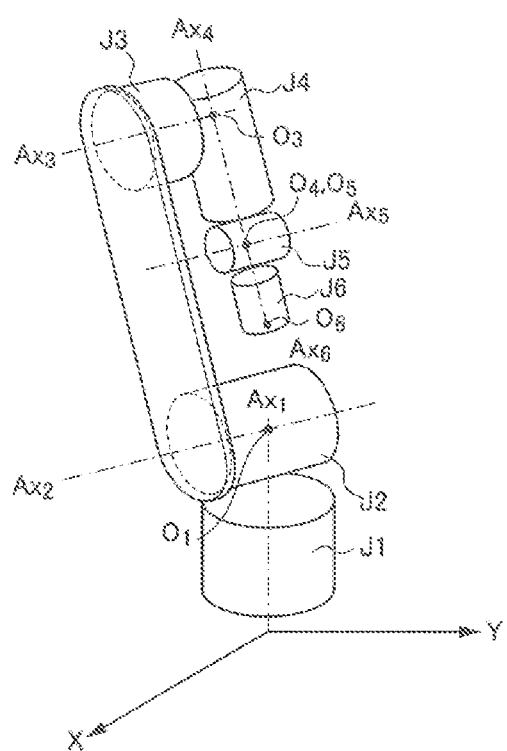
FIG. 7 is a perspective view of a modeled reference robot in a case in which the robot has a certain posture.
Figure 8:
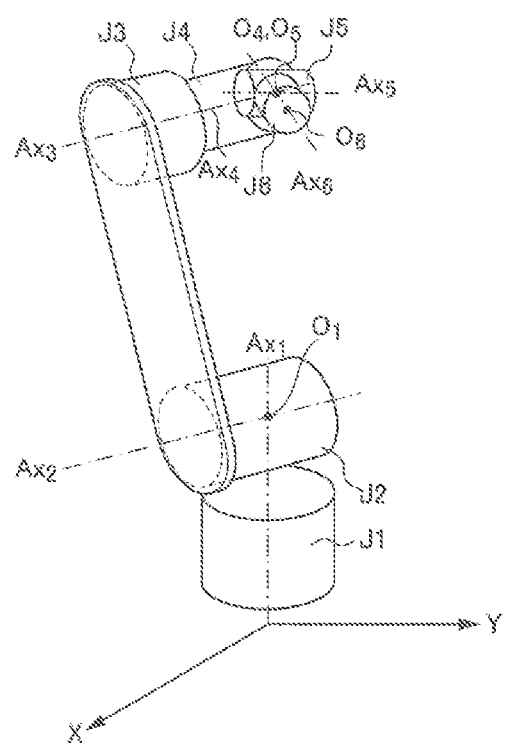
FIG. 8 is a perspective view of the modeled reference robot in a case in which the robot has another posture.

Meanwhile, FIGS. 7 and 8 are perspective views of a robot model (hereinafter, referred to as "a reference robot model") which is modeled based on the joints and the links of the reference robot and represent different postures of the robot R. FIG. 7 shows the same posture as that in FIG. 5, and FIG. 8 shows the same posture as that in FIG. 6.

In FIGS. 7 and 8, the reference robot model includes six joints J1 to J6, and axes of the six joints J1 to J6 are axes $Ax_1$ to $Ax_6$ which are the same as those in the robot model according to the present embodiment. However, unlike the robot model according to the present embodiment, in the reference robot model, there is no offset between the axis $Ax_4$ and the axis $Ax_6$, and an intersection point $O_4$ and an intersection point $O_5$ coincide with each other.

Figure 9:
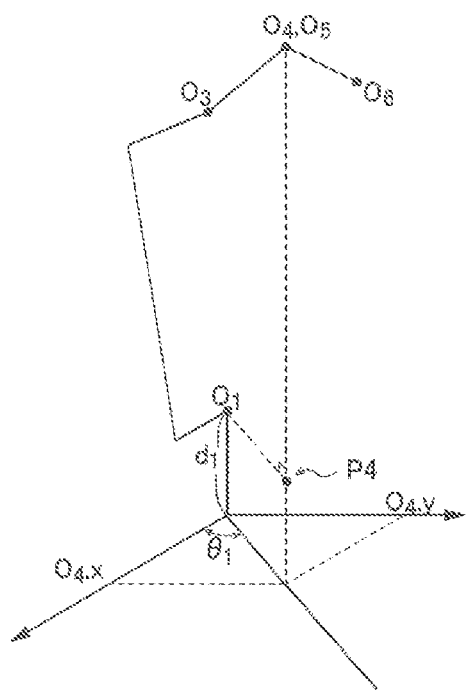
FIG. 9 is a view showing a relationship between rotation axes of joints of the reference robot of FIG. 8.
Figure 10:
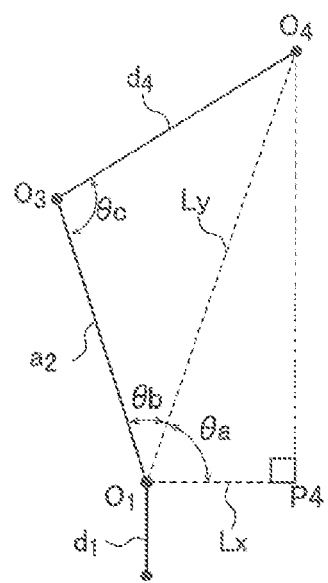
FIG. 10 is a view for describing an algorithm of analysis of inverse kinematics of the reference robot of FIG. 8.

Next, a calculation algorithm of analysis of inverse kinematics of the reference robot model will be described with reference to FIGS. 9 and 10. FIG. 9 is a view showing a relationship between the rotation axes of the joints of the reference robot model of FIG. 8. FIG. 10 is a view for describing an algorithm of the analysis of the inverse kinematics of the reference robot model of FIG. 8.

FIG. 9 shows a relationship between the axes of the respective joints of the reference robot model shown in FIG. 8 and intersection points. Further, an intersection point $O_1$ is an intersection point of an axis $Ax_1$ and an axis $Ax_2$.

The reference robot model, which is a model of a PUMA-type robot, has the following features.

In the reference robot model, regardless of rotation angles $\theta_1, \theta_2, \theta_3, \theta_5$, and $\theta_6$ of the joints J1, J2, J3, J5, and J6, unless the joint J4 rotates, intersection points $O_1, O_3, O_4$, and $O_5$ and a point $O_6$ are on the same plane. The same plane is hereinafter referred to as "an arm plane." That is, as the joint J1 rotates, the arm plane itself rotates around the joint J1. However, unless the joint J4 rotates, the intersection point $O_1, O_3, O_4$, and $O_5$ and the point $O_6$ are always on the arm plane. When the rotation angle $\theta_4$ of the joint J4 is changed, the point $O_6$ at an installation position of the end effector deviates from the arm plane.

In the reference robot model, even when the rotation angle $\theta_4$ of the joint J4 is changed and the end effector deviates from the arm plane, a position of the intersection point $O_4$, which is an intersection point of the axis $Ax_4$, the axis $Ax_5$, and the axis $Ax_6$ on the arm plane, may be calculated when a position and a posture of the end effector are given. That is, since the point, which is moved by a distance d6 along the axis $Ax_6$ from the point $O_6$ at the installation position of the end effector, becomes a common point between the intersection point $O_4$ and the intersection point $O_5$, the position of the intersection point $O_4$ may be easily calculated.

After the position of the intersection point $O_4$ is calculated, the rotation angles of the joints J1 to J3 may be calculated from geometry on the arm plane as follows.

FIG. 10 is a view showing a positional relationship between the intersection point $O_4, O_3$, and $O_1$ on the arm plane. In FIG. 10, a point P4 is an intersection point of a perpendicular line drawn from the intersection point $O_1$ with respect to a perpendicular line drawn from the intersection point $O_4$ onto a xy plane of a world coordinate system.

First, referring to FIG. 9, the rotation angle $\theta_1$ of the joint J1 may be calculated according to the following Equation 2 on the basis of $O_4 \cdot x$ and $O_4 \cdot y$, which are x and y coordinates of the world coordinate system of the calculated intersection point $O_4$.

$$\theta_1 = \tan^{-1} \frac{O_4 \cdot y}{O_4 \cdot x} \tag{2}$$

Further, in the arm plane shown in FIG. 10, a distance Lx between the intersection point $O_1$ and the point P4 and a distance Ly between the intersection point $O_1$ and the intersection point $O_4$ may be calculated according to the following Equations 3 and 4 using $O_4 \cdot z$, which is coordinates of the world coordinate system of the intersection point $O_4$.

$$Lx = \sqrt{O_4 \cdot x^2 + O_4 \cdot y^2} \quad (3)$$

$$Ly = \sqrt{O_4 \cdot x^2 + O_4 \cdot y^2 + (O_4 \cdot z - d_1)^2} \quad (4)$$

Therefore, since angles $\theta_a$, $\theta_b$, and $\theta_c$ may be geometrically calculated from FIG. 10, rotation angles $\theta_2$ and $\theta_3$ of the joint J2 and J3 may be calculated.

Figure 11:
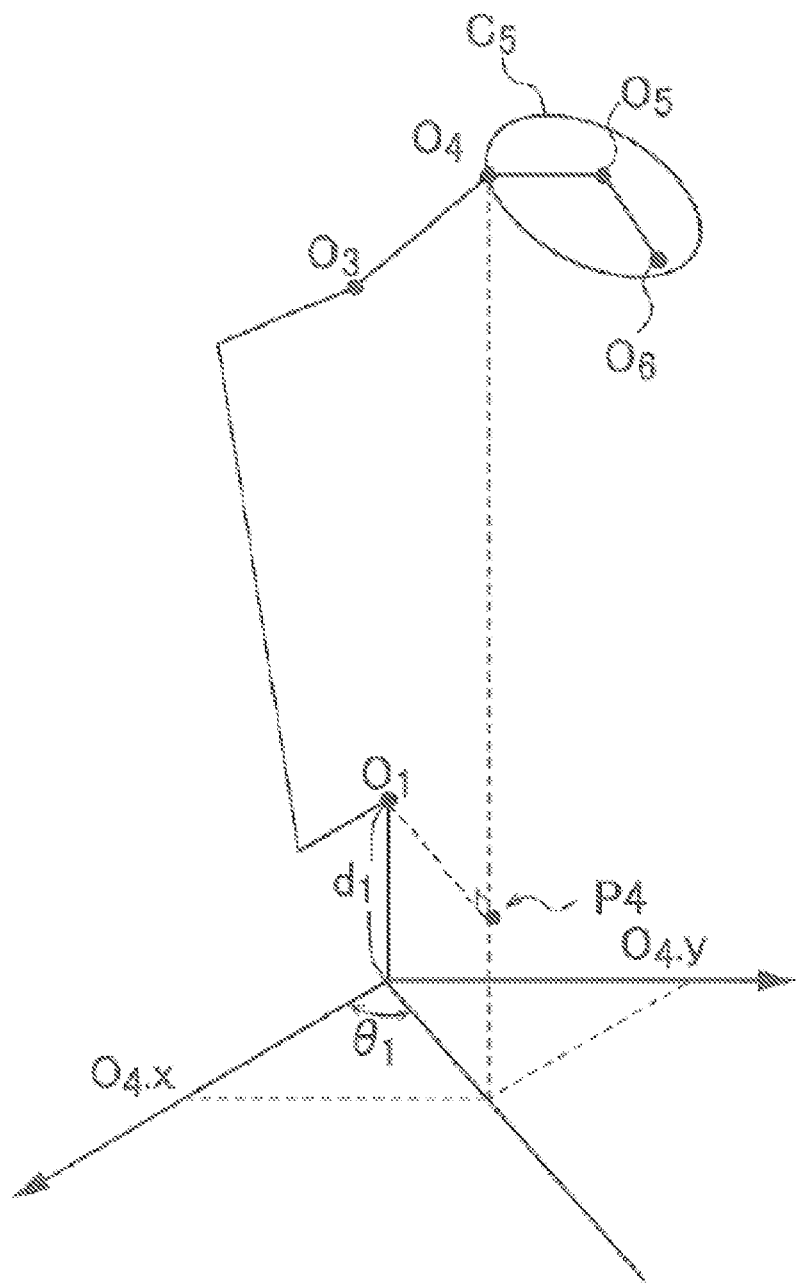
FIG. 11 is a view showing a relationship between rotation axes of joints of the robot according to the example embodiment of FIG. 6.
Figure 12:
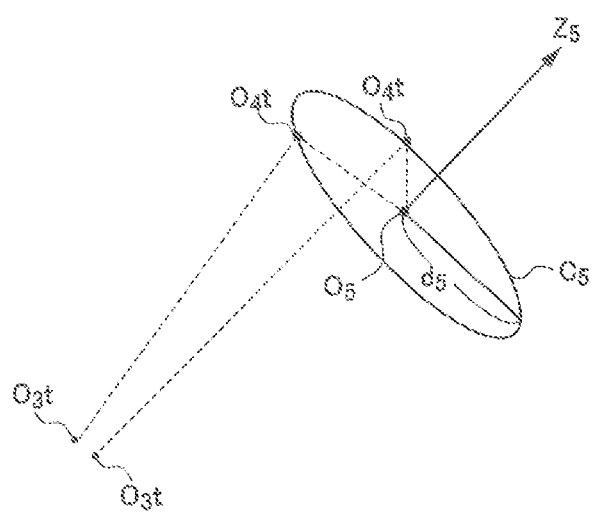
FIG. 12 is a view for describing an algorithm of analysis of inverse kinematics of a robot according to an example embodiment of the present disclosure.

Next, an algorithm in the present embodiment will be described with reference to FIGS. 11 and 12. FIG. 11 is a view showing a relationship between the rotation axes of the joints of the robot R according to the present embodiment of FIG. 6. FIG. 12 is a view for describing an algorithm of analysis of inverse kinematics of the robot R according to the present embodiment.

In the robot model according to the present embodiment, since there is an offset between the axis $Ax_4$ and the axis $Ax_6$, the intersection point $O_4$ and the intersection point $O_5$ do not coincide. When the position and the posture of the end effector are given, since an interlink distance d6 is known, the intersection point $O_5$ may be obtained from the point $O_6$, but the intersection point $O_4$ may not be obtained from the intersection point $O_5$. This is because it is not possible to know in which direction the axis $Ax_5$ is directed.

Therefore, convergence calculation is performed while estimation is performed on the position of the intersection point $O_4$. It is considered that the intersection point $O_4$ is positioned on a circumference of a circle (the circle is indicated by a circle C5 in FIGS. 11 and 12) having a radius $d_5$ around an original point on a xy plane of a link coordinate system with the axis $Ax_5$ as a z axis $z_5$ (in FIG. 12).

As shown in FIG. 12, a point $O_4$t on the circumference of the circle C5 is determined as a point of interest, and a candidate point $O_3$t, which is an intersection point $O_3$ when the point $O_4$t of interest is taken as the intersection point $O_4$, is obtained in the same manner as the algorithm of the reference robot model. In the robot model according to the present embodiment, since the arm plane is also determined by the intersection points $O_1$, $O_3$, and $O_4$ in the same manner as that in the reference robot model, the candidate point $O_3$t may be obtained according to the geometric relationship as shown in FIG. 10.

Since the axis $Ax_4$ and the axis $Ax_5$ are orthogonal to each other due to constraint conditions of the links of the robot R, it may be determined that the point $O_4$t of interest is the intersection point $O_4$ when an inner product value of a vector (an example of a first vector) directed from the candidate point $O_3$t to the point $O_4$t of interest and a vector (an example of a second vector) directed from the point $O_4$t of interest to the intersection point $O_5$ is zero. Therefore, the point $O_4$t of interest is sequentially moved on the circumference of the circle C5, and processing is performed so as to search for a point at which the inner product value becomes zero. In addition, in consideration of a calculation time, when an absolute value of the inner product value is less than or equal to a predetermined threshold as a convergence condition, it may be estimated that the point $O_4$t of interest is the intersection point $O_4$.

After coordinates of the intersection point $O_4$ are specified, the rotation angles $\theta_1$ to $\theta_3$ of the joints J1 to J3 may be calculated using the same algorithm as that used in the reference robot model.

Next, a configuration of a robot control apparatus 3 according to the present embodiment will be described with reference to FIG. 13.

Figure 13:
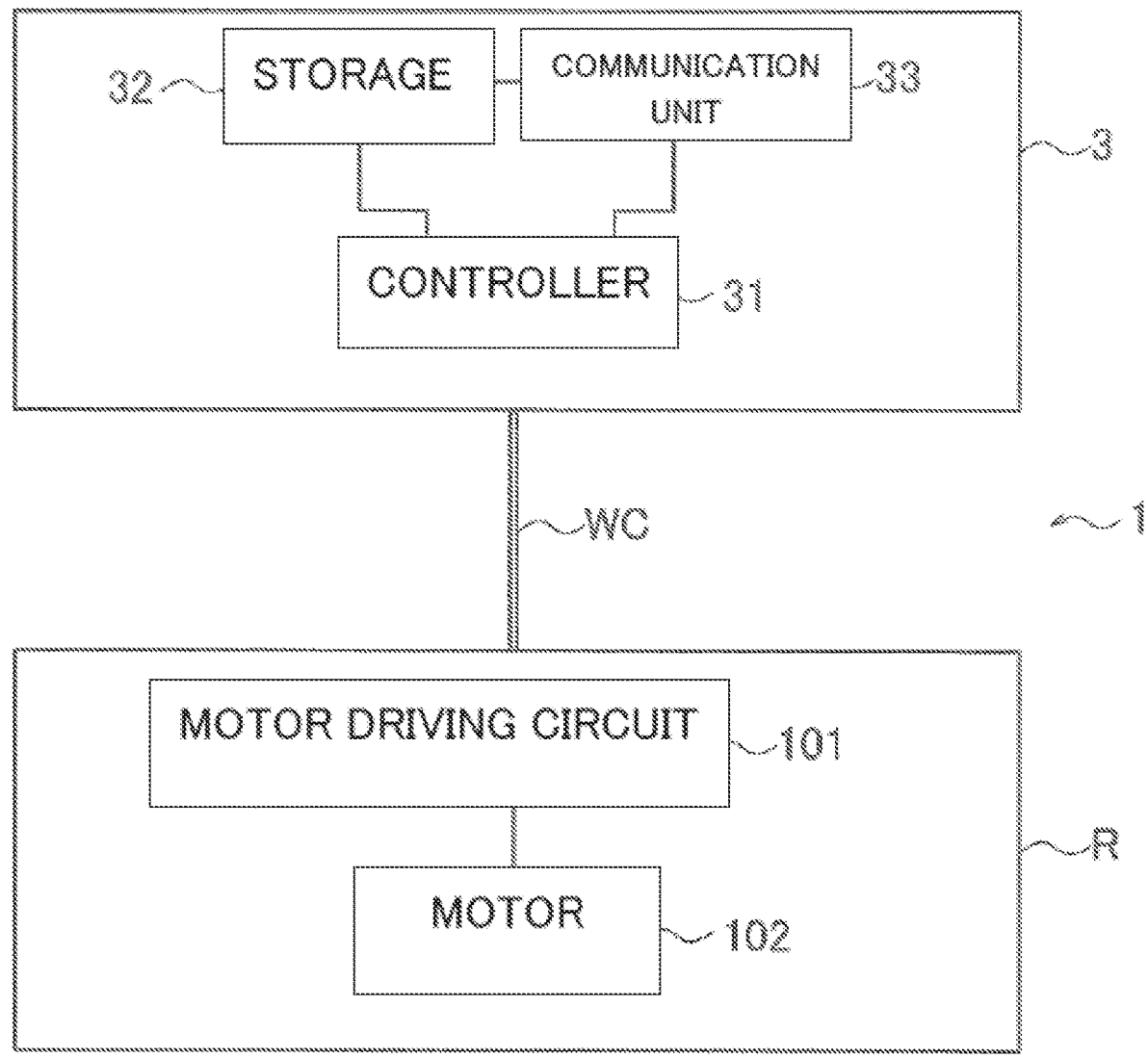
FIG. 13 is a block diagram showing a configuration of a robot system according to an example embodiment of the present disclosure.

FIG. 13 is a block diagram showing the configuration of the robot system according to the present embodiment.

As shown in FIG. 13, the robot control apparatus 3 includes a controller 31, a storage 32, and a communication unit 33.

The controller 31 includes a central processing unit (CPU), a read only memory (ROM), and a random access memory (RAM) The CPU receives a robot program from an external information processing apparatus (not shown), stores the robot program in the storage 32, and loads and executes the robot program in the RAM. Each function which will be described below is realized by the robot program executed by the CPU of the controller 31. The algorithm according to the present embodiment is included in the robot program.

The controller 31 generates a control pulse for operating each of the joints 11 to 16 by executing the robot program.

The storage 32 is a mass storage device such as a hard disk drive (HDD) or a solid state drive (SSD). The robot program, the above-described DH parameters (or the link parameters), and execution log data, which is an execution record of the robot program, are stored in the storage 32.

The communication unit 33 includes a communication interface circuit, which communicates with another communication device and receives the robot program. The communication unit 33 is communicably connected to, for example, a robot teaching device (not shown) operated by an operator, and receives the robot program from the robot teaching device.

As shown in FIG. 13, the robot R includes a motor driving circuit 101 and a motor 102, which are embedded into each of the joints 11 to 16. The motor driving circuit 101 drives the motor 102 in response to a command from the controller 31.

Figure 14:
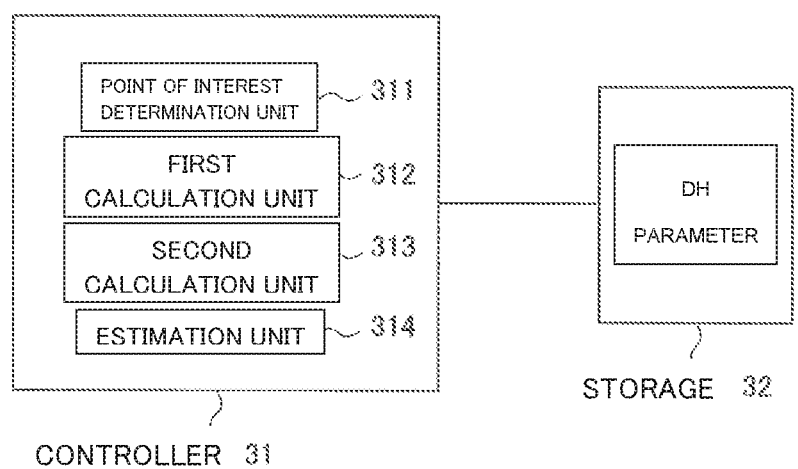
FIG. 14 is a functional block diagram of a robot control apparatus according to an example embodiment of the present disclosure.

Next, functions realized by the robot program which is executed by the controller 31 of the robot control apparatus 3 will be described with reference to FIG. 14. FIG. 14 is a functional block diagram of the robot control apparatus 3 according to the present embodiment.

As shown in FIG. 14, blocks for functions realized by the robot control apparatus 3 include a point of interest determination unit 311, a first calculation unit 312, a second calculation unit 313, and an estimation unit 314.

As described above, the robot R according to the present embodiment is a 6-axis vertical articulated robot in which an axis $Ax_6$ of a joint J6 and an axis $Ax_5$ of a joint J5 perpendicularly intersect each other, the axis $Ax_5$ and an axis $Ax_4$ of a joint J4 perpendicularly intersect each other, the axis $Ax_4$ and an axis $Ax_3$ of a joint J3 perpendicularly intersect each other, and there is a predetermined amount of offset between the axis $Ax_6$ and the axis $Ax_4$. The controller 31 of the robot control apparatus 3 according to the present embodiment executes the robot program to obtain an angle of each joint of the robot R when the position and the posture of the end effector are given to the axis $Ax_6$.

The point of interest determination unit 311 has a function of sequentially determining a point $O_4$t of interest, which is a point on a circumference of a circle having the interlink distance $d_5$ (an example of a predetermined amount) as a radius, around the intersection point $O_5$, on a plane which includes the intersection point $O_5$ (an example of a first intersection point) which is an intersection point of the axis $Ax_6$ and the axis $Ax_5$ and is orthogonal to the axis $Ax_6$. The plane, which includes the intersection point $O_5$ and is orthogonal to the axis $Ax_6$, refers to a xy plane of the link coordinate system with the axis $Ax_5$ as a Z axis. The controller 31 determines, for example, a point which is sequentially moved on the circumference of the circle C5 shown in FIGS. 11 and 12 in the same direction at a predetermined interval (pitch) as the point $O_4t$ of interest.

The first calculation unit 312 has a function of calculating a candidate point $O_3t$ (an example of a second intersection point), which is an intersection point of the axis $Ax_4$ and the axis $Ax_3$, when it is assumed that the point $O_4t$ of interest determined by the point of interest determination unit 311 is the intersection point $O_4$ of the axis $Ax_5$ and the axis $Ax_4$. As shown in FIG. 10, the candidate point $O_3t$, which is the intersection point $O_3$ when it is assumed that the intersection point $O_4$ is the point $O_4t$ of interest, may be obtained based on the geometric relationship on the arm plane.

The second calculation unit 313 has a function of calculating an inner product value of a first vector directed from the candidate point $O_3t$ calculated by the first calculation unit 312 to the point $O_4t$ of interest and a second vector directed from the point $O_4t$ of interest to the intersection point $O_5$. Since coordinates of the point $O_4t$ of interest, the candidate point $O_3t$, and the intersection point $O_5$ in the robot coordinate system are known, the inner product value may be calculated.

The estimation unit 314 has a function of estimating that the point $O_4t$ of interest when an absolute value of the inner product value calculated by the second calculation unit 313 is less than or equal to a predetermined threshold is the intersection point $O_4$ of the axis $Ax_5$ and the axis $Ax_4$.

Figure 15:
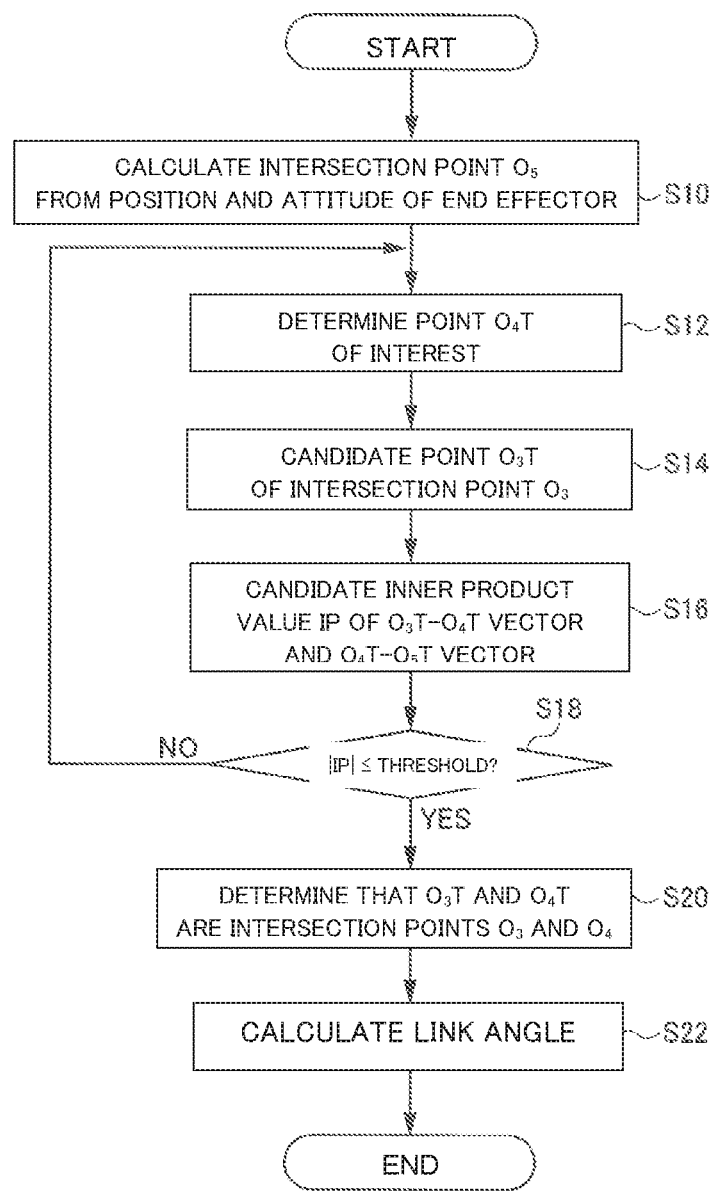
FIG. 15 is a flowchart executed by a robot control apparatus according to an example embodiment of the present disclosure.

Next, processing of the robot control apparatus 3, on which the algorithm according to the present embodiment is implemented, will be described with reference to a flowchart of FIG. 15.

In the robot program, values of the position and the posture of the end effector, which are required from teaching information of the robot, are described. The controller 31 of the robot control apparatus 3 calculates the intersection point $O_5$ of the axis $Ax_6$ and the axis $Ax_5$ from the required values of the position and the posture of the end effector (S10). Since the point $O_6$ at the installation position of the end effector, the direction of the axis $Ax_6$, and the interlink distance d6 are known, the controller 31 may calculate coordinates of the intersection point $O_5$.

Next, the controller 31 determines the point $O_4t$ of interest, which is a point on a circumference of a circle having the interlink distance $d_5$ as a radius, around the intersection point $O_5$ on a plane which includes the intersection point $O_5$ (an example of the first intersection point) and the plane which is orthogonal to the axis $Ax_6$ (S12). A setting start position of the point $O_4t$ of interest on the circumference of the circle C5 may be arbitrarily determined.

When the point $O_4t$ of interest is determined, the controller 31 calculates the candidate point $O_3t$ of the intersection point $O_3$ on the basis of the geometric relationship on the arm plane shown in FIG. 10 (S14).

Next, the controller 31 calculates an inner product value of a vector directed from the candidate point $O_3t$ to the point $O_4t$ of interest and a vector directed from the point $O_4t$ of interest to the intersection point $O_5$ (S16). When an absolute value of the obtained inner product value is less than or equal to a predetermined threshold (NO in operation S18), the controller 31 moves the point $O_4t$ of interest (i.e., changes the point $O_4t$ of interest) on the circumference of the circle C5 at a predetermined interval (pitch) and re-performs processing of operations S12 to S18.

When the inner product value obtained in operation S16 is less than or equal to the predetermined threshold (YES in operation S18), it may be determined that a line connecting the candidate point $O_3t$ to the point $O_4t$ of interest and a line connecting the point $O_4t$ of interest to the intersection point $O_5$ are substantially orthogonal to each other and the constraint conditions of the links are satisfied. Therefore, the controller 31 determines that the candidate point $O_3t$ and the point $O_4t$ of interest when the inner product value is less than or equal to the predetermined threshold are the intersection point $O_3$ and the intersection point $O_4$ (S20).

Next, the controller 31 calculates the rotation angles $\theta_1$ to $\theta_3$ of the joints J1 to J3 on the basis of the geometric relationship on the arm plane shown in FIG. 10 based on the intersection point $O_3$ and $O_4$ determined in operation S20 (S22).

As described above, according to the robot control apparatus 3 according to the present embodiment, even when there is an offset (i.e., the interlink distance $d_5$ in FIG. 4) in the wrist portion of the robot R, the rotation angle of each joint may be calculated by a relatively simple calculation when the position and the posture of the end effector are given. That is, it is possible to reduce a calculation load of inverse kinematics of the robot having an offset in the wrist portion of the robot R.

Although the embodiments of the robot control apparatus of the present disclosure have been described, the present disclosure is not limited to the above embodiments.

According to the above description, it is understood by those skilled in the art that a program for causing a computer to implement the functions described in the functional block diagram of FIG. 14 and a computer readable storage medium (including a nonvolatile storage medium), in which the program is recorded, are disclosed.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A robot control apparatus for obtaining an angle of each joint of a 6-axis vertical articulated robot when a position and a posture of an end effector attached on a sixth axis are given, wherein, in the 6-axis vertical articulated robot, the sixth axis of a sixth joint and a fifth axis of a fifth joint perpendicularly intersect each other, the fifth axis and a fourth axis of a fourth joint perpendicularly intersect each other, the fourth axis and a third axis of a third joint perpendicularly intersect each other, and there is a predetermined amount of offset between the sixth axis and the fourth axis, the robot control apparatus comprising:
    determination circuitry to sequentially determine a point of interest, which is a point on a circumference of a circle having the predetermined amount of offset as a radius, around a first intersection point, on a plane which includes the first intersection point which is an intersection point of the sixth axis and the fifth axis and the plane which is orthogonal to the sixth axis;
    a first calculation circuitry to calculate a second intersection point, which is an intersection point of the fourth axis and the third axis, when it is assumed that the point of interest is an intersection point of the fifth axis and the fourth axis;

a second calculation circuitry to calculate an inner product value of a first vector directed from the second intersection point calculated by the first calculation circuitry to the point of interest and a second vector directed from the point of interest to the first intersection point; and estimation circuitry to estimate that the point of interest, when an absolute value of the inner product value is less than or equal to a predetermined threshold, is an intersection point of the fifth axis and the fourth axis;

wherein the sequentially determination of the point of interest, the calculation of the second intersection point, the calculation of the inner product value of the first vector, and the estimation that the point of interest is the intersection point of the fifth axis and the fourth axis are all performed in real-time.

2. The robot control apparatus of claim 1, wherein the determination circuitry, the first calculation circuitry, the second calculation circuitry, and the estimation circuitry are defined by a controller.

3. A method of obtaining an angle of each joint of a 6-axis vertical articulated robot when a position and a posture of an end effector attached on a sixth axis are given, wherein, in the 6-axis vertical articulated robot, the sixth axis of a sixth joint and a fifth axis of a fifth joint perpendicularly intersect each other, the fifth axis and a fourth axis of a fourth joint perpendicularly intersect each other, the fourth axis and a third axis of a third joint perpendicularly intersect each other, and there is a predetermined amount of offset between the sixth axis and the fourth axis, the method comprising:

sequentially determining a point of interest; which is a point on a circumference of a circle having the predetermined amount of offset as a radius, around a first intersection point, on a plane which includes the first intersection point which is an intersection point of the sixth axis, and the fifth axis and the plane which is orthogonal to the sixth axis;

calculating a second intersection point which is an intersection point of the fourth axis and the third axis when it is assumed that the point of interest is an intersection point of the fifth axis and the fourth axis;

calculating an inner product value of a first vector directed from the second intersection point to the point of interest and a second vector directed from the point of interest to the first intersection point; and estimating that the point of interest, when an absolute value of the inner product value is less than or equal to a predetermined threshold, is an intersection point of the fifth axis and the fourth axis;

wherein the sequentially determining the point of interest, the calculating the second intersection point, the calculating the inner product value of the first vector, and the estimating that the point of interest is the intersection point of the fifth axis and the fourth axis are all performed in real-time.

4. A non-transitory computer-readable medium containing a computer program that causes a computer to perform a method of obtaining an angle of each joint of a 6-axis vertical articulated robot when a position and a posture of an end effector attached on a sixth axis are given, wherein, in the 6-axis vertical articulated robot, the sixth axis of a sixth joint and a fifth axis of a fifth joint perpendicularly intersect each other, the fifth axis and a fourth axis of a fourth joint perpendicularly intersect each other, the fourth axis and a third axis of a third joint perpendicularly intersect each other, and there is a predetermined amount of offset between the sixth axis and the fourth axis, the method comprising:

sequentially determining a point of interest, which is a point on a circumference of a circle having the predetermined amount of offset as a radius, around a first intersection point, on a plane which includes the first intersection point which is an intersection point of the sixth axis and the fifth axis and the plane which is orthogonal to the sixth axis;

calculating a second intersection point which is an intersection point of the fourth axis and the third axis when it is assumed that the point of interest is an intersection point of the fifth axis and the fourth axis;

calculating an inner product value of a first vector directed from the second intersection point to the point of interest and a second vector directed from the point of interest to the first intersection point; and estimating that the point of interest, when an absolute value of the inner product value is less than or equal to a predetermined threshold, is an intersection point of the fifth axis and the fourth axis;

wherein the sequentially determining the point of interest, the calculating the second intersection point, the calculating the inner product value of the first vector, and the estimating that the point of interest is the intersection point of the fifth axis and the fourth axis are all performed in real-time.

* * * * *